United States Patent [19]
Faconti, Jr.

[11] 3,815,261
[45] June 11, 1974

[54] PHASE-ORIENTED DISPLAY

[75] Inventor: Victor Faconti, Jr., Binghamton, N.Y.

[73] Assignee: Singer-General Precision, Inc., Binghamton, N.Y.

[22] Filed: Oct. 30, 1970

[21] Appl. No.: 85,670

[52] U.S. Cl.................................. 35/12 F, 35/11
[51] Int. Cl........................ B64g 7/00, G09b 9/08
[58] Field of Search.......... 35/10.2, 11, 12 F, 12 N; 340/172.5; 235/198

[56] References Cited
UNITED STATES PATENTS

| | | | |
|---|---|---|---|
| 3,400,471 | 9/1968 | Papin et al. | 35/12 K |
| 3,523,374 | 8/1970 | Schuster | 35/11 |
| 3,535,683 | 10/1970 | Woods et al. | 340/172.5 |
| 3,537,191 | 11/1970 | Aso | 35/11 |
| 3,580,978 | 5/1971 | Ebeling | 35/12 N |
| 3,707,044 | 12/1972 | Faconti, Jr. et al. | 35/12 N |

OTHER PUBLICATIONS

"The DC-10 Flight Simulator," by Link Group/Singer-General Precision, Inc., printed Dec. 1968, 3rd & 4th pages

*Primary Examiner*—Robert W. Michell
*Assistant Examiner*—L. R. Oremland
*Attorney, Agent, or Firm*—Francis L. Masselle; James C. Kesterson

[57] ABSTRACT

A method providing to an instructor in a flight simulator, or the like, a phase oriented display containing only the most important aircraft information relating to the phase of the mission being flown, as opposed to the usual display of all information at all times. The total training mission is divided into phases and logic employed to detect the mission phase in progress and automatically select for display the information deemed most important to that phase.

6 Claims, 3 Drawing Figures

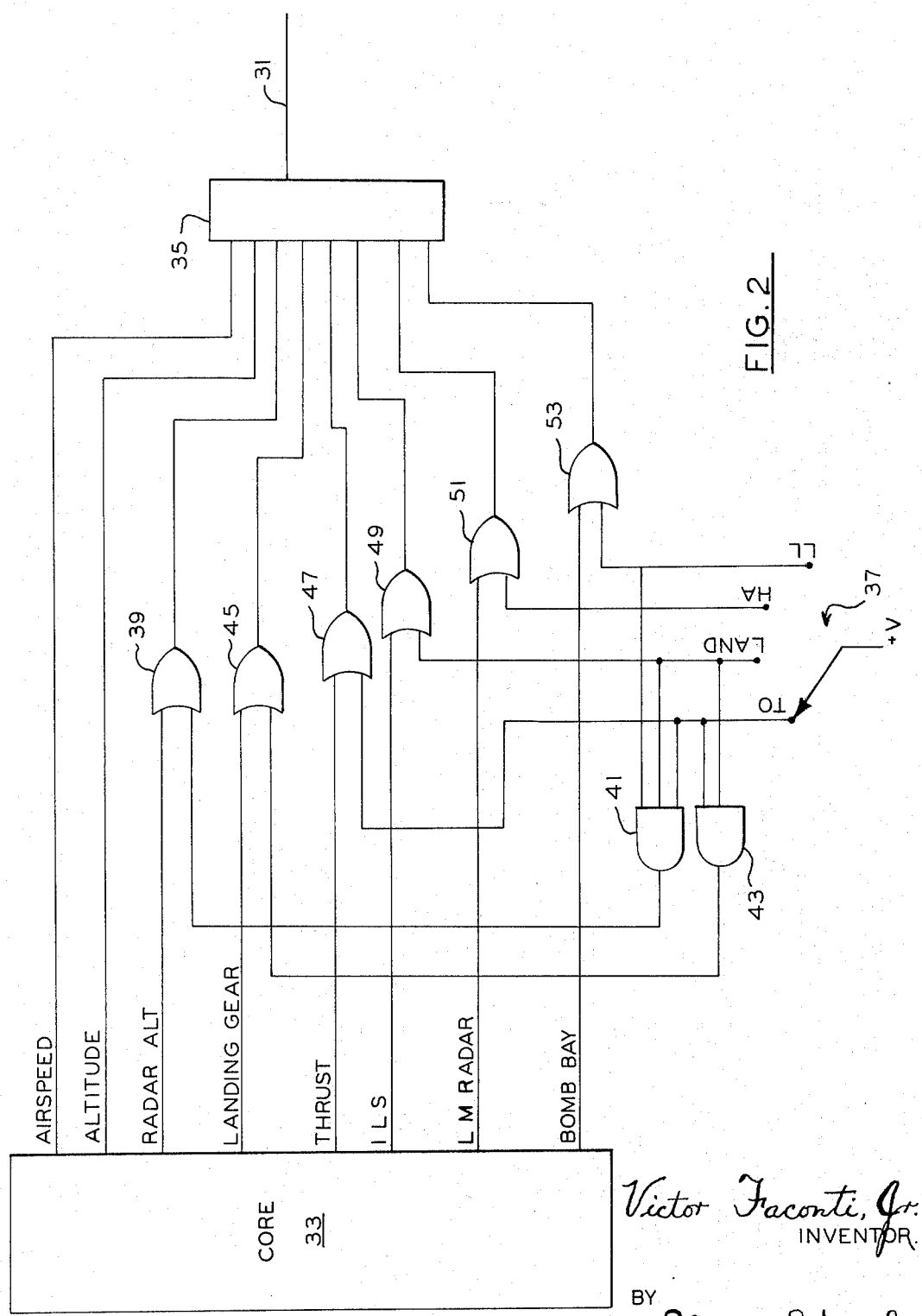

PHASE-ORIENTED DISPLAY

The Invention herein described was made in the course of or under a contract, or subcontract thereunder, with the Department of the Air Force.

The invention relates to flight simulators and more particularly to a method and apparatus providing an improved instructor display for use with such simulators.

Flight simulators for use in aircraft and spacecraft pilot training have gained much importance with the increased cost and complexity of modern day flight hardware. Aircraft flight time is expensive and any training which may be accomplished on the ground results in great cost savings. In the cases of spacecraft, training must be done on the ground by necessity. Generally a simulator comprises an exact copy of the aircraft or spacecraft cockpit including all controls and instruments, a computer wherein inputs from the controls are processed through the proper equations to provide instrument outputs, and an instructor's station.

The instructor to perform his task must have available at the instructor's station the same instrument indications as the pilot has in the cockpit. In addition he must have controls for setting up particular problems, altering these problems as necessary, and communicating with the student pilot. One of his primary tasks is to monitor student performance by observing indications on the repeaters of the cockpit instruments. This is no small task in a complex aircraft or spacecraft where upwards of 200 separate indicators may be present in the cockpit.

The most common way to present this information to the instructor has been by means of installing a repeater at the instructor's station for each cockpit indication he must monitor. Some newer systems present the information on an alpha-numeric CRT display, the information arranged in pages which may be selected by the instructor. In either of these systems the instructor must take time from his primary tasks of evaluation and problem control to determine which indications to observe.

The present invention avoids this problem by presenting to the instructor automatically, on an alpha-numeric CRT, the information most important at the particular phase of the training mission which is then taking place. It will be evident that not all indications are important at all times or phases of the mission. For example, indications of tactics information is not necessary during take off and landing, and ILS indications are not needed during gunnery training. Thus, by arranging information in accordance with the phase of the mission it is possible to present a display to the instructor which will give him the necessary information automatically and free him to perform other tasks more efficiently.

It is a principal object of this invention to provide an improved method of presenting to a flight simulator instructor information concerning cockpit indications and settings in the simulated aircraft or spacecraft.

Another object is to provide such an instructor with a phase oriented display of selected indications of present simulator operation.

It is also an object to provide an instructor's display system which will automatically display only the most important information associated with current operation of a training simulator and free the instructor for other tasks.

Other objects will in part appear hereinafter and in part will be obvious.

The invention accordingly comprises the method and the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing in which:

FIG. 2 is a logic diagram of a preferred embodiment of the selection of data to be displayed.

Figure 1:
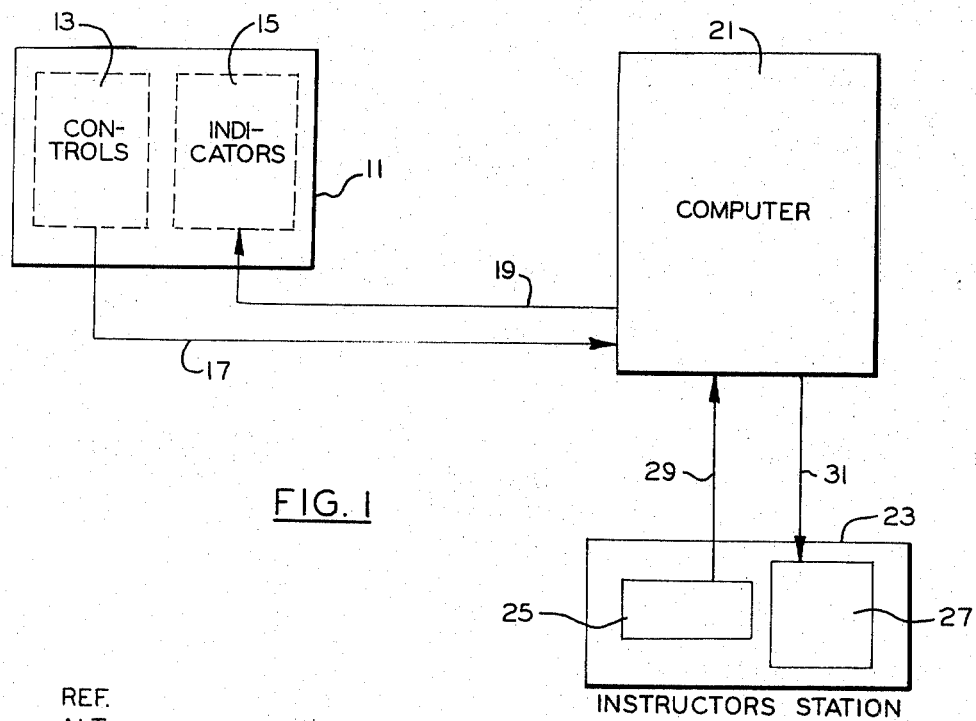
FIG. 1 is a block diagram of a simulator system in which the invention may be used.

FIG. 1 shows a simple block diagram of the system in which the present method may be used. Although the invention is shown and described as it would be employed in aircraft simulator the method may be used with a spacecraft or any other type of simulator. Simulator cockpit 11, containing controls and indicators indicated by the dotted blocks 13 and 15, respectively, is connected by lines 17 and 19 to computer 21. Computer 21 may be any of a number of digital computers normally used with simulators, such as a Model SEL 86, manufactured by Systems Engineering Laboratories, Fort Lauderdale, Florida. Controls 13 include the normal flight controls such as throttle, rudder, stick, etc. and settings of switches such as circuit breakers, radio channel selection, lights, etc. and electrical signals commensurate with the condition thereof are fed to computer 21 over wires collectively indicated by line 17. Indicators 15 include such things as airspeed indicator, turn and bank indicator, indicator lights etc, and are provided with appropriate signals from computer 21 over wires collectively indicated by line 19.

Also connected to computer 21 is instructor's station 23, containing controls 25 and an alpha numeric CRT 27. Controls 25, which include controls for set up of flight conditions and malfunction insertion, are connected to computer 21 by wires collectively indicated by line 29. Indications of cockpit instruments and settings are provided to CRT 27 over wires indicated collectively by line 31. In operation the instructor sets up the simulator and problem with his controls 25. This information will be fed to computer 21 over line 29 and will be used in the computer equations to provide outputs on line 19 to initialize instrument readings in the cockpit. For example, if the problem was set up for take-off the altimeter and airspeed indicator would be set to zero. Using this same example of take-off, the information provided at CRT 27 would be an indication of those readings and settings most important during take off. The manner in which this is done will be described below.

As the student pilot performs a simulated take-off, his manual manipulation of the simulated controls are provided over line 17 to computer 21 where they become inputs to the equations of motion and engine equations stored therein. These equations then provide the proper outputs on line 19 to indicators 15. For example, as the simulated aircraft accellerates and gains altitude proper indications will be given on the airspeed indicator and altimeter. Once the aircraft is in flight the information provided to CRT 27 will be changed to indicate the types of information most pertinate to the type of flight involved. For example, once the wheels are retracted an indication of this item is no longer necessary. On the other hand, if the mission is low level flight, a radar altimeter indication is important.

In order to use this method of a phase-oriented display it is first necessary to analyze all the phases of the training mission and determine which instrument indications are most critical during each phase. The following table shows some examples of the indications which might be displayed during certain training phases:

| Phase | Landing | Take-Off | Low Level Flight | High Alt. Bombing |
|---|---|---|---|---|
| Displayed Items | Altimeter | Altimeter | Altimeter | Altimeter |
| | Radar Alt | Radar Alt | Radar Alt | Airspeed |
| | Airspeed | Airspeed | Airspeed | Bomb Status |
| | Landing | Landing | Landmass | Bomb bay |
| | gear | gear | radar | doors |
| | ILS | Thrust | | |

Although only a few items are listed it should be obvious that the same method may be applied to all the possible items to be displayed. In the preceding table The mission is divided into four phases including take-off, landing, low level flight and high altitude bombing. Certain items such as airspeed and altitude must be displayed at all times; other information, such as landing gear position, is displayed only during take-off and landing phases, and still other information, such as ILS indications, landmass radar, and bomb bay door status, is displayed only during one phase of the mission.

FIG. 2 shows how the method may be implemented. Each of the items to be displayed will be calculated and stored in the computer core 33 in a manner well known in the art. The information to be displayed may then be gated from the core to a storage and sequencing device 35 which will then transmit it over a line 31 to be displayed on CRT 27 shown in FIG. 1. Method of receiving, storing and displaying information are well known in the display art and, since the present invention is concerned only with selecting the information to be displayed, will not be discussed herein.

The items which are always displayed are fed directly from the core 33 to device 35 as indicated by the lines labeled air speed and altitude. The remaining items shown are gated to device 35 depending on the setting of mission phase switch 37. As shown this switch has four positions, each corresponding to one of the training phases, take off (TO), Landing (LAND), Low level flight (LLF) and High altitude bombing (HA).

Radar altitude is provided as a first input to AND gate 39 which will have an output only when both inputs are present. Since radar altitude is needed for take-off, landing and low level flight, if any of these phases are occurring, the second input should be present. To accomplish this, an OR gate 41 is used having as inputs the outputs of switch 37 corresponding to takeoff, landing, and low level flight and having an output when any of these inputs are present. Another OR gate 43 is used to provide the second input to the landing gear AND gate 45. Thus, landing gear status will be displayed when switch 37 is set to take off or landing. The remaining inputs from the core 33 are Anded in AND gates 47, 49, 51, and 53 with second inputs from switch 37 corresponding to the phase during which they are to be displayed. Only a few examples have been shown and only one line shown for each example. It is obvious that the basic logic shown may be expanded to handle more inputs, and inputs of more than one line.

Figure 3:
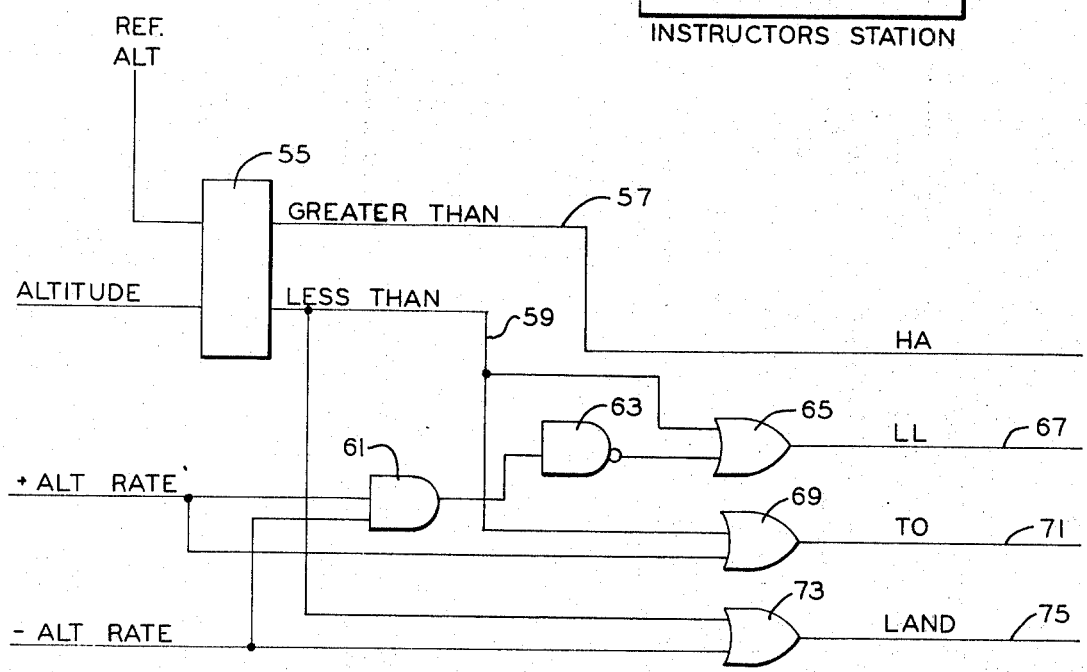
FIG. 3 is a logic diagram of a preferred embodiment of automatic phase selection apparatus.

FIG. 3 shows how mission phase may be generated automatically. If it is assumed that the phases are limited to those listed in the table, the logic shown on FIG. 3 may be used automatically to determine phase and thus display the proper information. Similar design may be used where more or different phases exist. It can be assumed that, if the aircraft exceeds a certain altitude, indicated on FIG. 3 by Ref. Alt., it is on a high altitude mission. This reference is fed to a comparator 55 which has a "greater than" output 57 and a "less than" output 59. The second input to comparator 55 is the indicated altitude of the simulator. If the altitude is greater than the reference an output will appear on line 57 which is also the HA input of FIG. 2 and information associated with high altitude flight will be displayed. If altitude is below this level any of the other three phases may be occurring. Thus, additional information is required. One sort of information which may be used is the direction and rate of change of altitude. Functions indicated on FIG. 3 as + Alt Rate and − Alt Rate may be generated in the computer when the altitude is steadily increasing or decreasing. These functions are provided as two inputs to OR gate 61. Thus, if altitude is changing steadily gate 61 will have an output. This output is an input to NOR gate 63 which is used as an inverter. It will have an output only when no input is present. This occurs only when altitude is not changing. The output of gate 63 is Anded in gate 65 with the "less than" signal of line 59. Therefore, if altitude is below the reference and not changing, an indication of low level flight, an output will be present on the LL line 67. If altitude is increasing a signal will be present on the + Alt Rate line which, when Anded with the "less than" signal in gate 69, will provide an output on the TO line 71. Likewise, if a − Alt Rate signal is present it will be Anded with the "less than" signal in gate 73 and provide an output on the LAND line 75. The computer must be programmed so that one of the outputs + or − Alt Rate is also present when the aircraft is on the ground to prevent a false indication of low level flight while waiting to take off or taxing after landing.

Many improvements and modifications may be made to the basic method without departing from the base logic involved, depending on the particular application in which it is used. The logic functions disclosed as being performed by individual gates can also be performed using the gating ability of a digital computer with the proper programs directing the And, Or and comparison functions. It can be seen that the invention provides an improved display method for presenting information to an instructor in such a manner that he will have all pertinent data available automatically and be free to perform other essential tasks.

What is claimed is:

1. A method of displaying to an instructor current values and conditions of parameters associated with operation of a training simulator during various phases of a simulated training mission, comprising the steps of:

a. establishing two or more distinct mission phases;
   b. identifying those parameters most pertinent to operation during each of said phases;

c. generating individual electrical signals commensurate with each of the values and conditions of all parameters;
d. providing display output means at the instructor's station for actuation by said electrical signals to visibly indicate said values and conditions;
e. selectively connecting only those electrical signals for actuation of said display means which are associated with those parameters most pertinent to simulator operation during the mission phase currently in progress; and
f. wherein the step of selectively connecting said electrical signals is performed by electronic logic adapted to determine the mission phase currently in progress from input values commensurate with operating conditions indicative thereof.

2. The invention according to claim 1 wherein said input values are compared electrically with preselected reference values above and below which the mission phase is different.

3. Apparatus for displaying to an instructor certain of the indications available to a trainee in a training simulator of instrument readings and control settings in accordance with the current phase of a simulated training mission, said apparatus comprising, in combination:
a. storage means wherein values indicative of all current instrument readings and control settings are stored;
b. selector means having an output indicative of mission phase;
c. gating means connected to said storage means and responsive to said selector means output to pass only those values from said storage means which are most pertinent to operation during the mission phase indicated by said storage means output;
d. display means connected to the output of said gating means and responsive to the values passed thereby to provide a visible display of the instrument readings and control settings of which said values are indicative; and
e. wherein said selector means includes electronic comparator means constructed and arranged to compare the instantaneous values of preselected parameters to stored values of said parameters above and below which said mission phase is different.

4. The invention according to claim 3 wherein said display means comprises an alpha-numeric CRT display.

5. The invention according to claim 3 wherein said gating means and said comparator means comprise a programmed digital computer.

6. The invention according to claim 5 wherein said instrument readings and control settings comprise the cockpit indications of a flight simulator.

* * * * *